(12) United States Patent
Andrews et al.

(10) Patent No.: US 6,302,778 B1
(45) Date of Patent: Oct. 16, 2001

(54) TURBINE ROOF VENTILATOR

(75) Inventors: Gabriel Andrews, 15 Annette Avenue, Ingelburn, New South Wales, 2565; Osama Tawfik, Bossley Park, both of (AU)

(73) Assignee: Gabriel Andrews, Wales (AU)

( * ) Notice: Subject to any disclaimer, the term of this patent is extended or adjusted under 35 U.S.C. 154(b) by 0 days.

(21) Appl. No.: 09/344,126

(22) Filed: Jun. 24, 1999

(30) Foreign Application Priority Data

May 13, 1999 (AU) .................................................. 28134/99

(51) Int. Cl.⁷ ..................................................... F23L 17/10
(52) U.S. Cl. ................................ 454/16; 454/18; 454/19; 454/900
(58) Field of Search ................................. 454/16, 18, 19, 454/900

(56) References Cited

U.S. PATENT DOCUMENTS

| | | | |
|---|---|---|---|
| 979,390 | * | 12/1910 | Ewart ....................................... 454/18 |
| 1,702,120 | * | 2/1929 | Kimball .................................. 454/19 |
| 1,857,762 | * | 5/1932 | Meadows ................................ 454/19 |
| 1,965,171 | * | 7/1934 | Boyer .................................. 454/19 X |
| 1,977,934 | * | 10/1934 | Bolton ..................................... 454/18 |
| 2,469,096 | * | 5/1949 | Wilson ................................... 454/18 |
| 4,416,415 | * | 11/1983 | Kolt .................................... 454/19 X |
| 4,648,312 | * | 3/1987 | Schad ................................. 454/18 X |
| 5,131,888 | * | 7/1992 | Adkins, II ......................... 454/900 X |

FOREIGN PATENT DOCUMENTS

| | | |
|---|---|---|
| 65886/96 | 4/1997 | (AU) . |
| 1523406 | 8/1978 | (GB) . |

* cited by examiner

*Primary Examiner*—Harold Joyce
(74) *Attorney, Agent, or Firm*—Morgan, Lewis & Bockius LLP

(57) ABSTRACT

A turbine roof ventilator includes a rotatable shaft defining an upper end and a lower end. A turbine hood is located on the upper end of the shaft and is adapted to turn with the shaft. A cylindrical sleeve is disposed below the turbine hood. The shaft is mounted in a bearing housing which is fixed relative to the cylindrical sleeve while allowing the shaft to rotate about its longitudinal axis. A fan or vane assembly is disposed on the lower end of the shaft and adapted to turn with the shaft so that as the turbine hood turns, the fan sucks air into the housing to improve the rate of flow of air through the roof ventilator.

7 Claims, 4 Drawing Sheets

TURBINE ROOF VENTILATOR

FIELD OF THE INVENTION

This invention relates to a roof ventilator, and in particular to a type of roof ventilator known as a turbine roof ventilator.

BACKGROUND OF THE INVENTION

During the summer, in hot countries such as Australia, large amounts of heat from the sun's rays enter houses through their roof tops and heat up the attic space or roof chamber beneath the roof of the house. In some cases the temperature in the roof chamber can rise to up to 70° C. and the temperature inside the house will consequently increase. To address this problem, it is known to install turbine roof ventilators to extract air from roof chambers which work on the well known principle that hot air rises, and which allow hotter air to escape from the roof chamber before the temperature of the air in the roof chamber rises excessively. During the winter, roof ventilators also help keep houses dry, remove shower and kitchen steam, keep insulation dry and thus help prevent mould and mildew growth.

Turbine roof ventilators comprise a rotatable sleeve on the top end of which is mounted a rotatable turbine wheel or hood. The turbine hood includes a closed circular, usually convex upper end which prevents ingress of rain into the sleeve and thus into the roof chamber, a lower ring and a series of arcuate turbine blades extending from the lower ring to the upper end through which hot air flows. The turbine blades can rotate either due to winds or breezes, or due to the flow of air from out under the roof through the turbine.

Although turbine roof ventilators work, several such devices may be required for even quite small roofs.

It is an object of the present invention to provide improvements to turbine roof ventilators which increase their efficiency and usefulness.

SUMMARY OF THE INVENTION

In a first aspect of the present invention there is provided a turbine roof ventilator including:

a rotatable shaft defining a first, or upper end, and a second end;

a turbine hood mounted on the upper end of the shaft and adapted to turn with the shaft;

a sleeve member through which air may flow disposed below the turbine hood;

means for mounting the shaft relative to the sleeve member whilst allowing the shaft to turn about its longitudinal axis; and a fan or the like disposed on the shaft generally below the turbine hood and adapted to turn with the shaft so that as the turbine hood turns the fan blows or sucks air through the sleeve to improve the rate of flow of air through the roof ventilator.

A second related aspect of the present invention a turbine hood for a turbine roof ventilator or the like for mounting on a bearing or the like for rotation of the turbine hood about its central axis, the turbine hood having a top and sides, the sides comprising a number of blades arranged generally radially of the axis of rotation of the turbine hood, the blades having an outer portion extending away from the hood and an interior portion extending inside the hood, gaps being defined between adjacent blades the arrangement being such that rotation of the hood about its axis may be caused by air currents acting on the outer portion of the hood and the interior portion of the blade is configured to impel air towards the top of the hood and when the turbine hood rotates about its axis.

Typically, the interior portion of the blade includes a scoop portion which when the turbine is caused to rotate in one direction about its axis of rotation is adapted to scoop air upwards into the turbine hood and in conjunction with a ceiling direct the air through the gaps between the turbine blades.

In a preferred feature the turbine hood includes one or more ribs on the outer portion of the blade to assist the outer portion to catch air currents.

In one particular embodiment there may be three ribs. The ribs are preferably located close to the outer edge of the outer portion of the blade.

The blades may be a flattened S-shape having a thickened portion between the outer concave and inner portions by means which the blade is attached between the cover and a base portion of the turbine hood.

It is preferred that the turbine hood defines a curved ceiling.

According to a yet further aspect of the present invention, there is provided a turbine roof ventilator including:

a rotatable shaft defining a first end, and a second end;

a turbine hood located on the upper end of the shaft and being adapted to turn with the shaft;

a cylindrical sleeve disposed below the turbine hood defining a aperture;

means for mounting the shaft in the cylindrical sleeve whilst allowing the shaft to rotate about its longitudinal axis; and a vane assembly disposed on the lower end of the shaft and adapted to turn with the shaft so that as the turbine hood turns the fan sucks air into the housing to improve the rate of flow of air through the roof ventilator characterised in that the vanes are movable to open or close the aperture The use of a fan in addition to a standard turbine hood significantly improves the rate of flow of air through the roof ventilator and thus improves the performance of the roof ventilator and lowers the temperature in the roof chamber compared with existing roof ventilators. Advantageously, the vanes may be moved to close off the roof ventilator when it is desired to do so for example in cold weather or perhaps to prevent the ingress of rain into the roof space.

In a yet further aspect, the present invention provides a turbine roof ventilator including:

a rotatable shaft defining a first end, and a second end;

a turbine hood located on the upper end of the shaft and being adapted to turn with the shaft;

a cylindrical sleeve disposed below the turbine hood defining a aperture;

means for mounting the shaft in the cylindrical sleeve whilst allowing the shaft to rotate about its longitudinal axis; and a vane assembly disposed on the lower end of the shaft and adapted to turn with the shaft so that as the turbine hood turns the fan sucks air into the housing to improve the rate of flow of air through the roof ventilator;

a motor arranged to turn either the vane assembly or shaft or both; and at least one photovoltaic solar cell adapted to supply power to the motor for turning either the vane assembly or shaft or both.

A turbine roof ventilator may be provided having the features of all the aspects of the present invention.

Throughout this specification, unless the context requires otherwise, the word "comprise", or variations such as "comprises" or "comprising", will be understood to imply the inclusion of a stated element, integer or step or group of elements, integers or steps but not the exclusion of any other element, integer or step or group of elements, integers or steps.

BRIEF DESCRIPTION OF THE DRAWINGS

Specific embodiments of the invention will now be described, by way of example only, and with reference to the accompanying drawings in which.

DETAILED DESCRIPTION OF THE PREFERRED EMBODIMENTS

Figure 1:
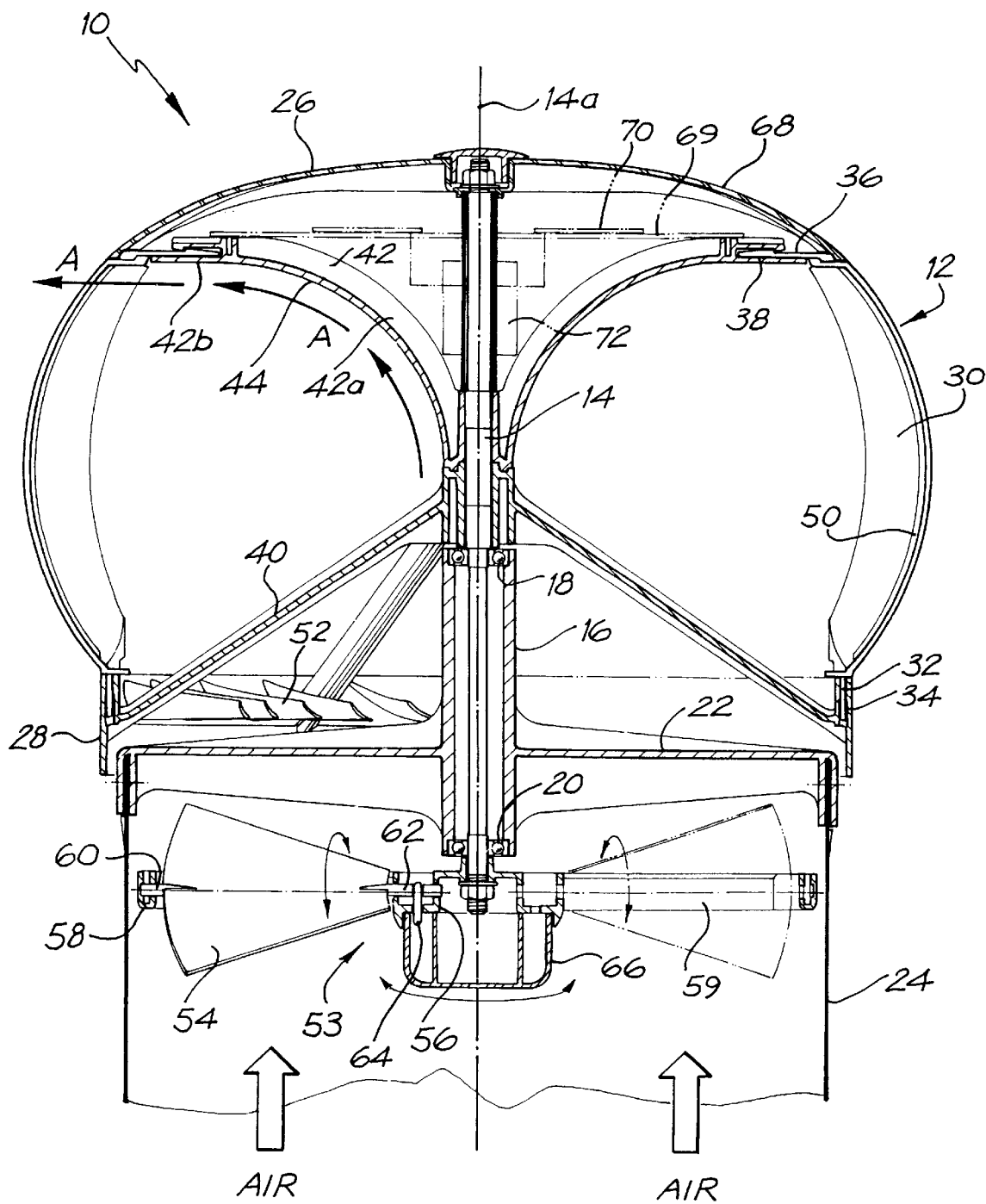
FIG. 1 is a schematic view of a first embodiment of a turbine roof ventilator.

Referring to the drawings, FIG. 1 shows a schematic view of a turbine roof ventilator 10 embodying the present invention. The roof ventilator includes a turbine hood or rotor head 12 which is mounted on a shaft 14. The shaft 14 is rotatably mounted in a bearing housing 16 on upper bearings 18 and lower bearings 20. The upper and lower bearings are preferably made of steel having a steel inner ring and a steel outer ring separated by a race of ball bearings. The shaft extends upwardly beyond the upper bearings 18 as far as the top of the turbine hood.

Four arms 22 extend away from the bearing housing in a cruciform configuration support the bearing housing and turbine hood above a cylindrical sleeve 24 through which hot air is to be drawn, in use.

The turbine hood 12 includes a roof or cover portion 26, a lower ring 28 and a series of blades 30 typically about twenty-four in number, which extend between the cover portion 26 and the lower ring 28. At the base of each blade there is a depending projection 32 which snap fits into a corresponding recess 34 in the lower ring. At the top of each blade there is a projection 36 which extends in a sideways direction which snap-fits into a corresponding recess 38 in the cover portion 26. A series of six spokes or arms 40 extend from lower ring to the shaft 14 for supporting the lower ring 28 for rotation with the shaft about the longitudinal axis 14a of the shaft. The cover portion 26 includes a series of curved ribs 42 which include a first arcuate portion 42a which extends from the shaft 14 through an angle of 90 degrees and an integral, relatively short, straight portion 42b which extends towards the perimeter of the cover portion 26. A curved ceiling 44 whose shape correspond to the surface of revolution obtained when the rib 42 is rotated 360 degrees around the longitudinal axis 14a of the shaft extends from the shaft 14 to the perimeter of the cover 26. The ceiling 44 is supported by the ribs 42, typically four in number. The ceiling 44 provides a barrier against the flow of air. The shape of the ceiling is such that such that air flowing up through the middle of the ventilator tends to flow up and along the ceiling radially of the shaft along a path shown by the arrows marked A, and out through gaps between adjacent blades of the turbine hood (see FIG. 2).

The blades 30 are curved in section (see FIG. 2) and have a tip portion which is almost tangential to the circumference of the turbine hood. The tip portion defines two projections or ribs 50 which extend along the length of the blade (see FIG. 1) and assist the blades in catching wind and air currents, for turning the hood in the direction B. The blades are also curved along their length as is best seen in FIG. 1 so that the turbine hood is generally rounded.

At the base of the turbine hood below the blades there is a series of scoop blades 52 which project inwardly towards the shaft. FIG. 1 shows a quarter of the ring of scoop blades. The scoop blades are angled at about 120 degrees or so to the direction of air flow through the sleeve 24. The blades are also slightly curved in cross-section. There are around eighteen scoop blades in total. As the turbine hood rotates the lower ring and scoop blades also rotate. They encourage air flow and have the effect of pushing the air upwards and when the air contacts the ceiling it is directed along the ceiling and outside the turbine hood. The above arrangement provided an efficient flow of air through the turbine with no dead spots where air can become trapped.

Figure 2:
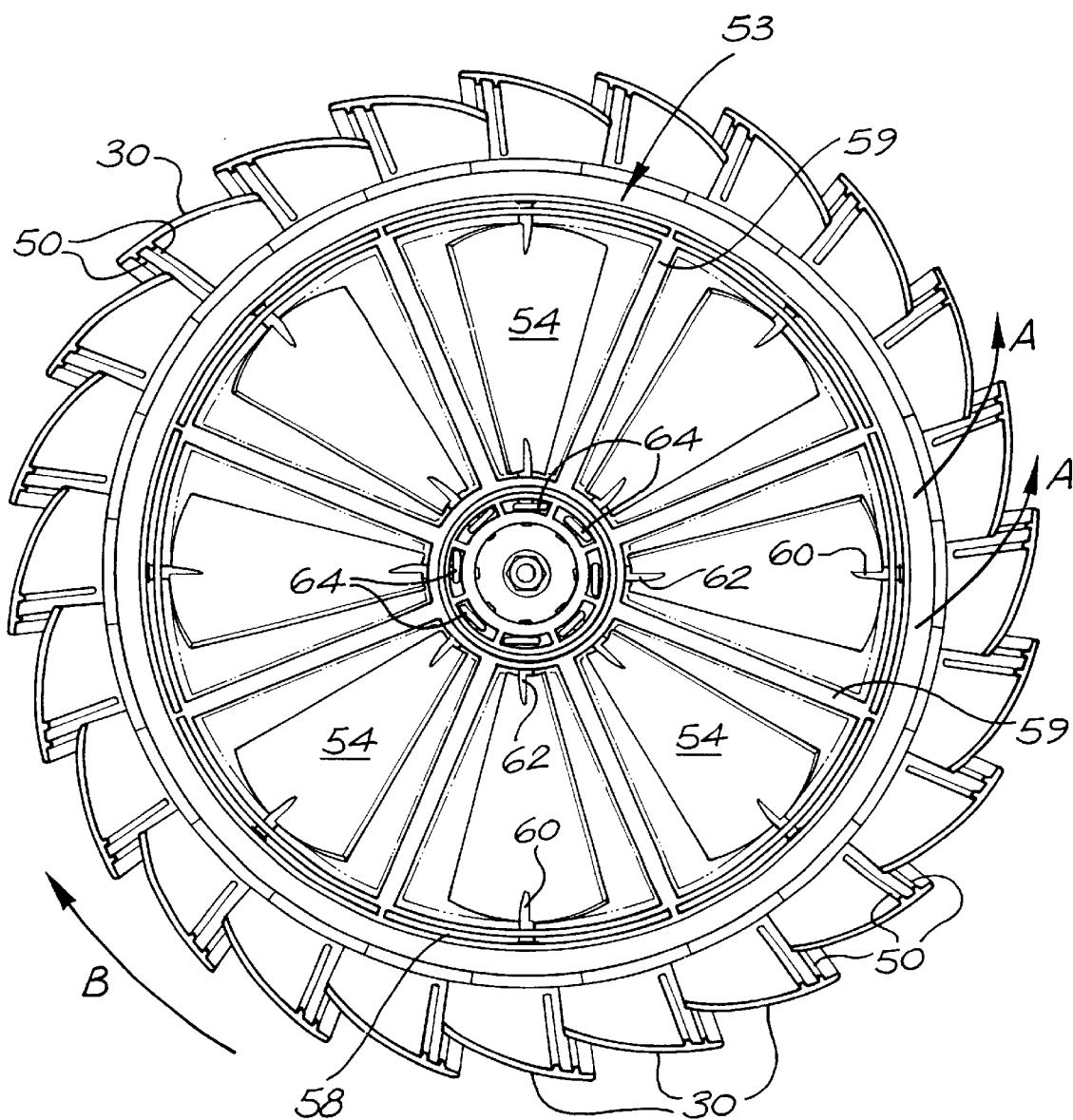
FIG. 2 is a schematic view section through the roof ventilator of FIG. 1.
Figure 3:
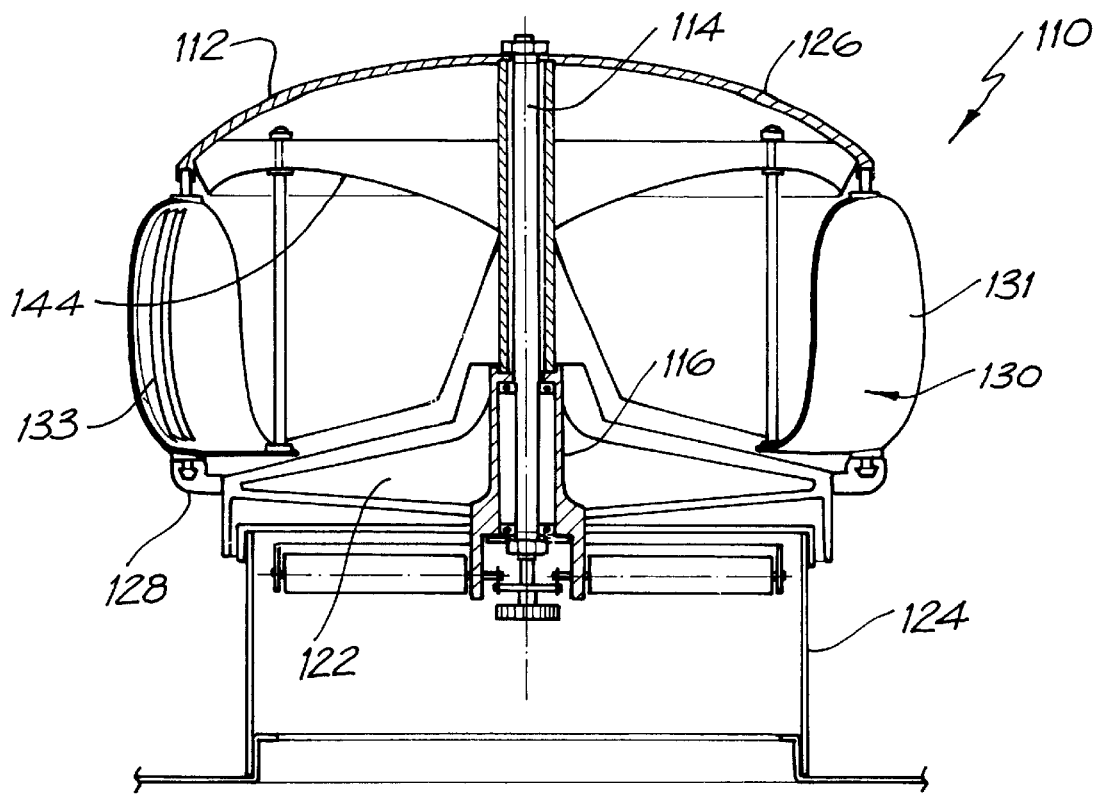
FIG. 3 is a schematic view of a second embodiment of a turbine roof ventilator.

With reference to FIG. 2 in particular, extraction of air through the sleeve is further improved by a fan/impeller/propeller assembly generally indicated at 53, comprising a number of planar fan blades or vanes 54. The vanes extend between a central block 56 mounted on the bottom of the shaft 14 to an outer ring 58. A series of spokes 59 also extend between the central block and the outer ring 58. A cylindrical rod like projection 60 is defined on the outer edge of the blade which locates in a cylindrical recess in the outer ring 58. A similar rod 62 projects from the inner edge of the blade and locates in a recess in the central block. An arm 64 extends from each rod 62. The vanes are mounted by means of the rods 60 and 62 so that they can be can be tilted about an axis defined by the rods. The arms 64 are all operatively connected to a control knob 66 mounted on the bottom of the shaft and turning of the knob causes the arms to move about the axis of the rods and thus turns the blades about that axis. The blades may all be oriented so that all the blades are all co-planar and oriented generally perpendicularly to the sleeve in which orientation the edges of the vanes abut the spokes and the fan closes off the sleeve inhibiting the flow of air through the roof ventilator. This also prevents the ingress of rain and the like. Alternatively the vanes 54 may be angled or raked so that as the fan 53 rotates about the shaft 14 it increases the flow of air through the turbine hood.

Projecting ribs 68 are provided on the top of the hood to catch the wind.

The top of the hood 26 is either made of a transparent material or may define transparent windows. A shelf 69 is provided below the top. A number of solar panels 70 are mounted on the shelf used to supply power to a motor 72 for turning the shaft 14 on windless days. The motor may be disposed at the base of the shaft and used to turn the fan 53.

Apart from the shaft 14 and the bearings and a number of the components such as screws and the like, most of the components may be made out of molded polycarbonate, although other suitable materials could be used.

FIGS. 3 to 6 show a schematic view of a second embodiment of a turbine roof ventilator 110. Much of the construction is similar to the first embodiment. For example, the roof ventilator 110 includes a turbine hood or rotor head 112 which is mounted on a shaft 114. The shaft 114 is rotatably mounted in a bearing housing 116 on upper and lower steel bearings. As in the first embodiment, four arms 122 extend away from the bearing housing in a cruciform configuration to support the bearing housing and turbine hood above a cylindrical sleeve 124 through which hot air is to be drawn, in use.

The turbine hood also has a roof or cover portion 126, a lower ring 128 and a series of blades 130 extending between the cover portion and the lower ring. The cover portion 126 also defines a curved ceiling which extends from the shaft 114 to the perimeter of the turbine hood.

Figure 4:
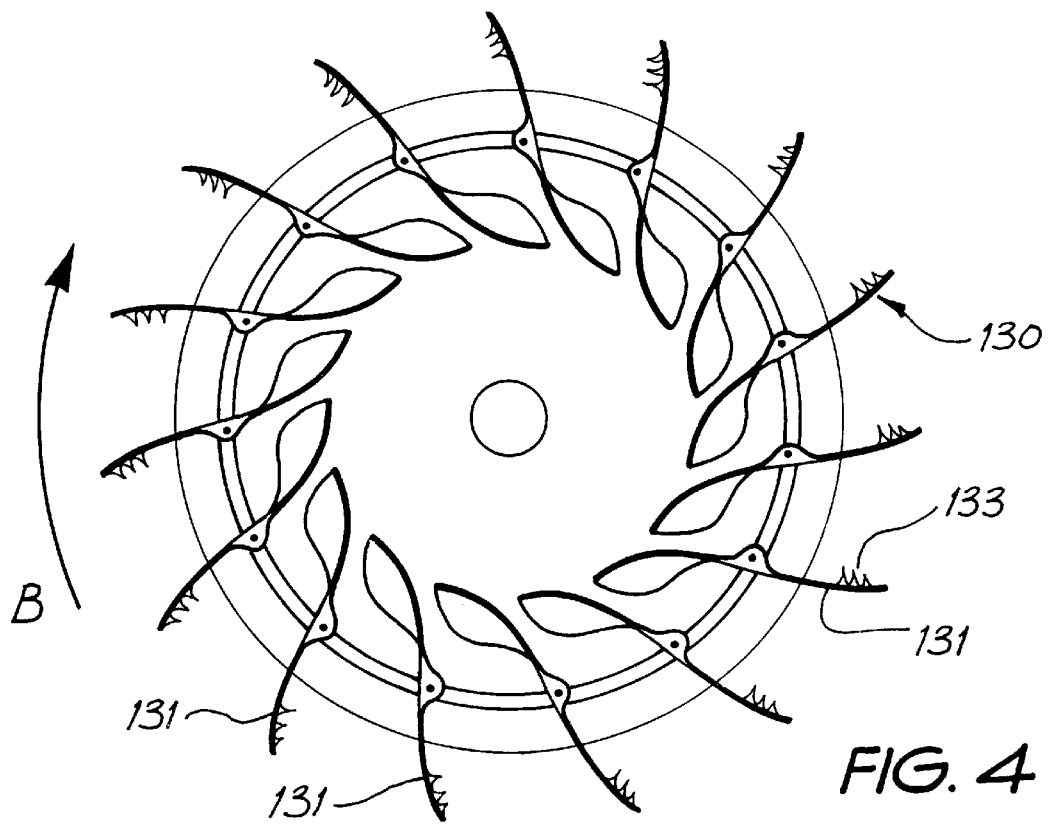
FIG. 4 is a schematic cross section through a turbine hood of the turbine roof ventilator of FIG. 4.
Figure 5:
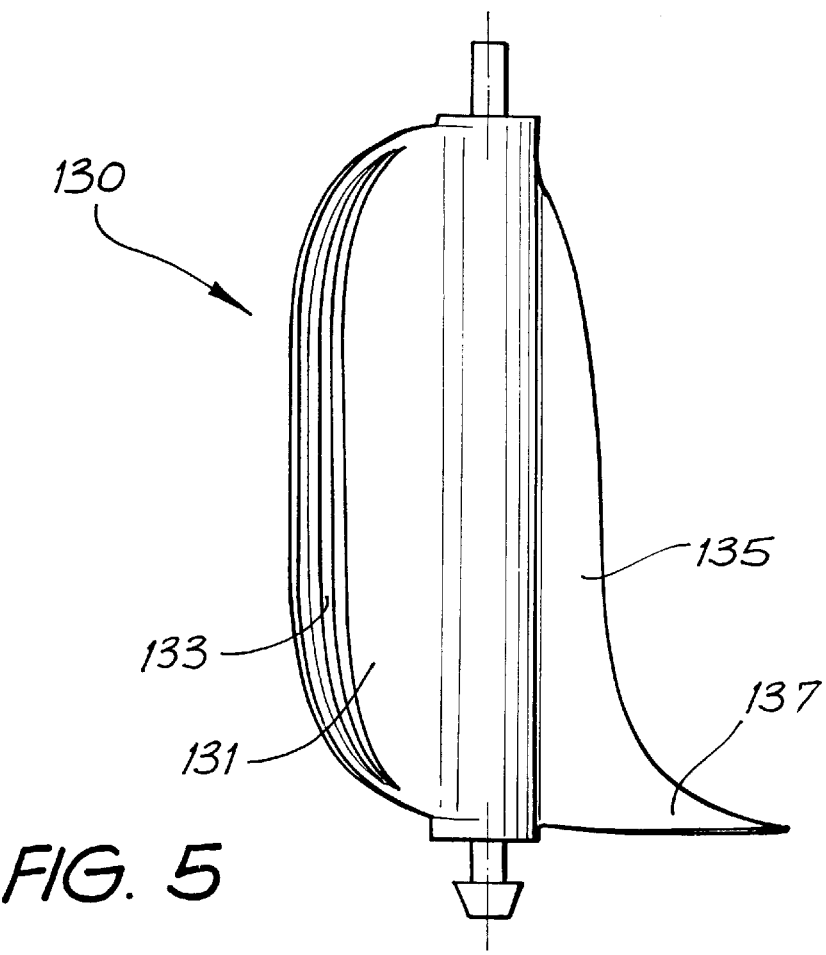
FIG. 5 is a pictorial view of a blade of the turbine hood.
Figure 6:
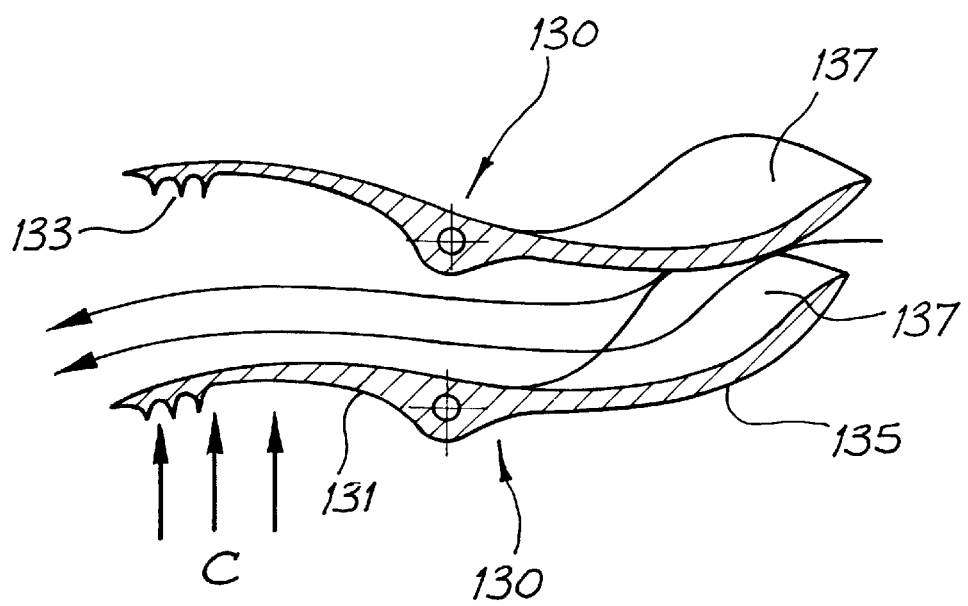
FIG. 6 is a schematic drawing illustrating a cross section through two adjacent blades illustrating the flow of hot air between the blades.

The major difference between the first and second embodiments lies in the shape of the blades and the absence of the separate scoop blades which in this second embodiment are defined by a lower part of blades 130. With particular reference to FIGS. 4 to 6 each blade has a generally flattened S-shaped cross section including a first concave portion 131 which extends beyond the perimeter of the cover and lower ring. Three ribs 133 project from the tip portion of the concave face 131. When the wind blows in the direction indicated by the arrow B the wind impinges on the blade and causes the rotor head to turn in direction B. The ribs 133 improve the ability of the concave portion 131 to catch the wind. Each blade also has a second concave portion 135. The second concave portion is shorter than the first concave portion, faces the opposite direction to the first concave portion and extends into the hood. As is best seen in FIG. 5 the lower part of each blade includes a scoop portion 137 which also projects into the interior of the turbine hood. The scoop portion in use when the turbine hood rotates in a direction B the scoop portion 137 tends to scoop air from inside the turbine hood forcing that air upwards towards the ceiling from where it is directed back downwards and through the blades thus drawing hot air through the sleeve into the turbine hood and out into the atmosphere. The scoop portion 137 thus acts to increases the flow of air and the device works more efficiently.

The second embodiment also includes a fan with movable vanes 53 located at the bottom of the shaft in a similar arrangement to the first embodiment.

It will be appreciated by persons skilled in the art that numerous variations and/or modifications may be made to the invention as shown in the specific embodiments without departing from the spirit or scope of the invention as broadly described. For example, the number of blades ribs or vanes may be varied from that shown above. The present embodiments are, therefore, to be considered in all respects as illustrative and not restrictive.

The claims defining the invention are as follows:

1. A turbine roof ventilator for extracting air from an area including:
   a rotatable shaft defining a first, upper, end, and a second end;
   a turbine hood mounted on the upper end of the shaft and adapted to turn with the shaft, said turbine hood comprising;
   a cover portion;
   a lower ring portion;
   a series of main blades extending between the cover portion and the lower ring portion, each main blade having an upper part attached to the cover portion and a lower part attached to the lower ring portion, the main blades being arranged for catching air currents external to the hood to cause the hood to rotate in a first direction, the main blades being spaced apart to allow air flow between adjacent main blades;
   a sleeve member through which air may flow disposed below the turbine hood, the sleeve member defining an axial direction along which air flows, in use, into the turbine hood;
   mounting means for mounting the shaft relative to the sleeve member whilst allowing the shaft to turn about its longitudinal axis; and
   a series of scoop blades, each scoop blade being located or defined at or adjacent the lower part of a main blade and extending from the lower part of the main blade towards, but not as far as, the shaft, the scoop blades being arranged to rotate with the turbine hood; wherein the scoop blades are oriented at an obtuse angle with respect to the central axis of the sleeve so that as the turbine hood rotates in the first direction, the scoop blades direct air in the hood towards the top of the hood;
   wherein a curved ceiling is defined below and spaced from the cover portion, said ceiling flaring out from the shaft to the upper end of the main blades; and
   wherein, in use, as the turbine hood rotates, the scoop blades direct air towards the curved ceiling of the turbine hood which air is guided by the ceiling towards the upper part of the main blades.

2. A turbine roof ventilator as claimed in claim 1 wherein the shaft is rotatable in a bearing housing which is mounted to the sleeve member by means of at least three arms which extend from the bearing housing to the sleeve member.

3. A turbine roof ventilator as claimed in claim 1 wherein an impellor is mounted on the lower end of the shaft and adapted to turn with the shaft below the bearing housing, in use.

4. A turbine hood as claimed in claim 1 further including one or more projections formed on the outer portion of the blade arranged to catch air currents.

5. A turbine roof ventilator as claimed in claim 1 further comprising:
   a motor arranged to turn either the vane assembly or shaft or both; and
   at least one photovoltaic solar cell adapted to supply power to the motor for turning either the vane assembly or shaft or both.

6. A turbine roof ventilator as claimed in claim 5 wherein the top of the hood is made of a transparent material and the photovoltaic cell is located on a shelf disposed beneath the top of the hood.

7. A turbine roof ventilator as claimed in claim 5 wherein the top of the hood is made of a transparent material and the photovoltaic cell is located on a shelf or the like disposed beneath the top of the hood.

* * * * *